United States Patent [19]

Compton

[11] Patent Number: 4,986,065
[45] Date of Patent: Jan. 22, 1991

[54] AGRICULTURAL HARVESTER

[76] Inventor: Ira Compton, 2434 Dayton Rd., Chico, Calif. 95928

[21] Appl. No.: 467,514

[22] Filed: Jan. 19, 1990

[51] Int. Cl.⁵ .............................................. A01D 46/00
[52] U.S. Cl. ..................................... 56/340.1; 56/329
[58] Field of Search ..................... 56/328.1, 329, 340.1

[56] References Cited

U.S. PATENT DOCUMENTS

| | | | |
|---|---|---|---|
| 2,436,648 | 2/1948 | Isom | 56/329 |
| 3,218,790 | 11/1965 | Edgemond, Jr. | 56/329 |
| 3,473,310 | 10/1969 | Christianson | 56/329 |
| 3,505,801 | 4/1970 | Nye | 56/329 |
| 3,531,925 | 10/1970 | Vines et al. | 56/329 |
| 3,596,455 | 8/1971 | Adrain | 56/329 |
| 3,608,292 | 9/1971 | Perry | 56/329 |
| 3,621,643 | 11/1971 | Gerrans | 56/329 |
| 4,768,332 | 9/1988 | Bizzini | 56/340.1 |

*Primary Examiner*—Thuy M. Bui

[57] ABSTRACT

An improved double section, self-propelled harvester for harvesting nuts and fruits from trees. Each separate harvester section has an engine and sterring mechanics for operation by a single driver per section. Each section is structured to be simultaneously disposed one section on each side of a tree to form a V-shaped produce catch platform sloping toward a centrally positioned off-load system of conveyors. The off-load conveyors carry the produce for deposit into either hauling trailers attached one to each section or fruit boxes riding on the harvester. One harvester section is equipped with a self-centering trunk style shaker adapted to reach out and vibrate the tree to remove the produce therefrom. The trunk shaker has the ability to extend and retract horizontally for shaking the trunk of a smaller tree slightly above the ground, or to extend both horizontally and vertically at an angle to reach high up on the trunk of a large tree for grasping the trunk just below the cluster of main branches extending from the tree.

5 Claims, 15 Drawing Sheets

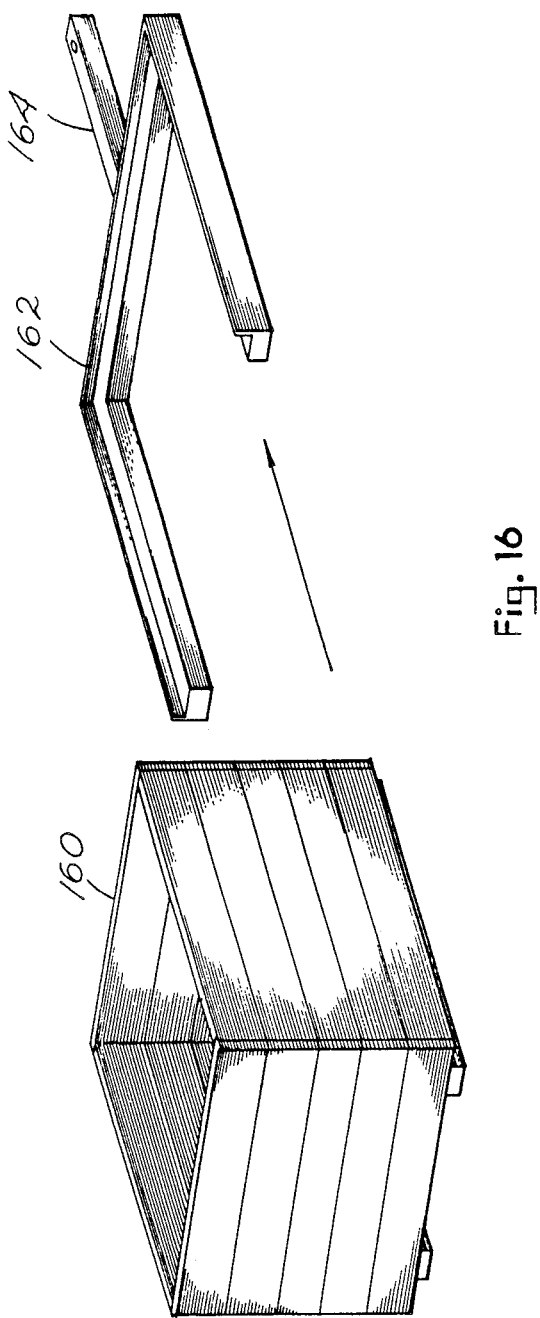

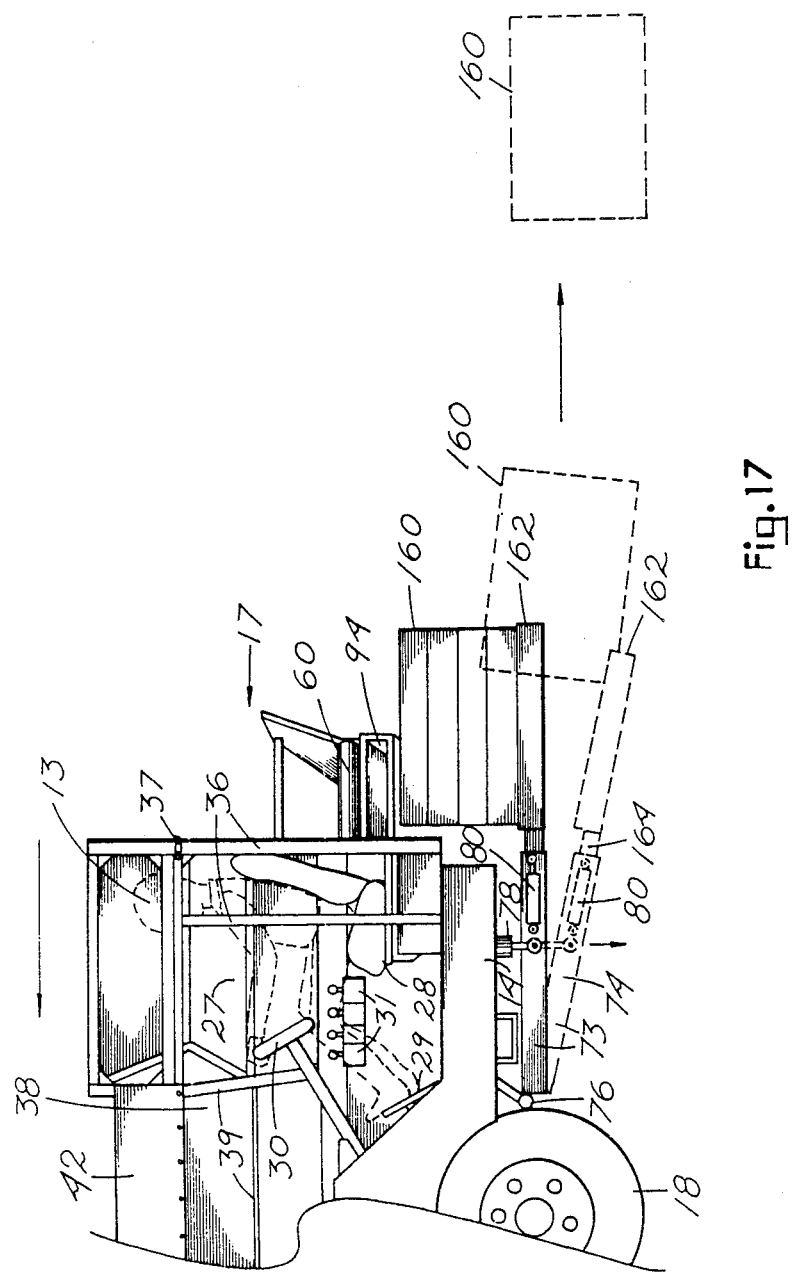

AGRICULTURAL HARVESTER

BACKGROUND OF THE INVENTION

1. Field of the Invention:

This invention relates to agricultural harvesting equipment in general, and more particularly to self-propelled machinery structured to harvest nuts and fruit directly off a tree. The improved double-sectioned harvester of this disclosure has the ability to shake the crop from a tree, catch the falling produce before it hits the ground and deliver the produce into awaiting trailers or fruit boxes transported by the harvester. My harvester is structured for rapidly harvesting nuts and fruits in very large orchards, being useful in combination with much larger than usual power-assisted, belly dump agricultural harvesting trailers of the type taught by Compton in U.S. Pat. No. 4,844,683 issued July 4, 1989. The tree trunk shaker of my harvester adapted for knocking produce out of the trees, is structured to function efficiently with large, solid trunks such as the type on pistachio and walnut trees, however it will also function efficiently with prunes, peaches and other smaller fruit and nut trees.

2. Description of the prior art:

A patent search was conducted at the U.S. Patent and Trademark Office to examine nut and fruit harvesters of the past art. The following U.S. Patents teach harvesting equipment related to the harvester taught in this disclosure.

A patent issued to W. L. Isom in Feb. 1948, U.S. Pat. No. 2,436,648, teaches a double section nut harvester. Each harvester section is a wheel supported conveyor bed adapted to be disposed on either side of the tree to catch nuts knocked from the tree. The nuts are moved by the conveyor beds into a carry-off conveyor system, one conveyor system on each of the sections where the nuts are carried and delivered into hauling trailers attached one to each wheeled section of the harvester. Each wheeled section of the harvester is adapted to be towed by a tractor. A tree shaker to remove the nuts from the tree is not provided as an integral part of the disclosed harvester and must be supplied as a separate piece of equipment.

A patent issued to J. L. Perry in Sept. of 1971, U.S. Pat. No. 3,608,292, teaches a "collection system for harvesting machines". The Perry disclosure teaches a harvester comprising two wheel-supported sections adapted to be disposed on each side of a tree for harvesting. Each harvester section has a platform to catch falling fruit shaken from the tree by a shaking apparatus attached to the harvester as an integral part thereof. The shaking apparatus is adapted to grasp the trunk of the tree near the ground below the fruit catching platform to shake the fruit from the tree. Each harvester section is propelled either by a tractor or an engine attached to the section. Conveyor means are supplied as a part of each section to move the fruit from the catching platform into fruit boxes.

A patent issued to C. R. Christianson in Oct. 1969, U.S. Pat. No. 3,473,310, teaches a harvesting apparatus similar to the above past art harvesters. The harvesting apparatus has a U-shaped frame for straddling a tree. Wheels are mounted on the frame, and a guide is connected to the frame for engaging the tree to direct the movement of the frame. A produce catcher and conveyor is mounted within the frame to carry away produce, and a deflectable cover is mounted on the produce catcher for receiving a portion of the tree and to deflect produce into the produce catcher. A produce shaker apparatus is mounted on the frame and is engageable with the tree to shake loose produce from the tree to be collected by the produce catcher and conveyor. Christianson has structured his device with a shaker apparatus adapted to shake individual A patent issued to W. A. Gerrans in Nov. 1971, U.S. Pat. No. 3,621,643, teaches a "soft fruit harvester". The two sectioned harvester includes a fruit-catching draper conveyor with fruit-decelerating means thereover supported between two steerable wheel trucks, each of which carries a movable shaker apparatus, the fruit dislodged by the shaker and dropping onto the draper conveyor being movable away from the tree for subsequent conveyance and deposit in a fruit bin. Each of the section of the harvester has an engine, is self-propelled and steerable, and has a limb shaking apparatus adapted for shaking individual tree limbs one at a time.

A patent issued to J. W. Edgemond, Jr. in Nov. 1965, U.S. Pat. No. 3,218,790, teaches a self-propelled two section harvester having a limb shaker on each section adapted to shake individual tree limbs one at a time. The harvester has conveying means adapted to unload fruit from fruit catch platforms into awaiting fruit boxes.

A patent issued to P. R. Adrian in Aug. 1971, U.S. Pat. No. 3,596,455, teaches a single-unit fruit harvester including a pair of conveyors for disposing on either side of the trunk of a tree, sheet means downwardly sloping from the trunk of the tree toward the conveyors to feed fruit falling thereon toward the conveyors, and a sheet of two sheet portions to feed fruit falling thereon toward the conveyors. The sheet portions are retractable so that they may be folded up to allow backing away from a tree for driving to the next tree. The harvester has a tree trunk shaker placed beneath the sheet portions adapted for shaking the trunk of the tree to dislodge the fruit. The placement of the shaking device below the sheets appears as if the operator would not have a complete unobstructed view to allow quick alignment of the shaker heads against the tree trunks. The sheets used with this type of machine are utilized primarily because they can be folded and are relatively soft so as not to bruise fruit. This type of harvester which must be backed away from each tree after harvesting and then pulled forward to the next tree is relatively slow due to the amount of maneuvering required to align the harvester and shaker with each tree.

Nuts and fruits (produce) growing on trees are increasingly being harvested using mechanized harvesters employing only one or two persons to operate rather than large teams of agricultural workers. Mechanical harvesters are becoming more able to efficiently harvest a wider variety of produce at a lower cost compared to hand picking and mechanical harvesters of the past art. Labor costs are one of the largest single expenses for a farmer today, and efficient mechanical harvesting equipment is just one way for the farmer to cut his overall cost of production.

Weather conditions at the time the crops are ready for harvest are another factor radically effecting a farmer's profit margin and ultimately the cost of the food to the consumer. Many crops ripen in fall, a period when unpredictable and untimely rain can occur. Rain severely damages many crops, and often rain is more damaging to the crops the closer they are to being ready for harvest. Crops harvested at peak ripeness are the most desirable to the consumer and bring higher prices for the farmer, however the farmer is exposing himself to a greater risk of damage to his crops from weather the longer he waits for the crops to ripen to perfection. Thus the ability of a farmer to harvest his entire ripened crop quickly, and at a low cost is of the utmost importance to all of us.

Rain shortly before harvest can also leave the soil in the orchard muddy, leading to a traction problem for many past art harvesters. Even without rain, many orchards have loose or sandy soils, and are sometimes are planted on slopes. These dry, loose soils can also lead to traction problems for many harvesters, particularly when a harvester off-loads into fruit boxes which are taken off the machine when full, removing traction supplying weight from the wheels of the harvester.

It is very important that a mechanical harvester be able to harvest all the ripe crop without leaving any of the produce in the trees. Just one or two percent of the crop left in the trees of a large orchard can amount to a substantial sum of money lost by the farmer. Also, rotting produce left on trees after harvest often leads to tree damaging diseases and insect infestations.

As noted in several of the above past art disclosures and recognized by all farmers, it is very important not to damage a tree while harvesting. Trees take many years to grow and a substantial amount of money can be lost by the death of a tree caused by an improperly designed or operated mechanical harvester. Several of the past art patents discussed damage to tree trunks caused by trunk shakers adapted to grasp the trunk of a tree and vibrate it to knock the fruit therefrom. Complete tree harvesters of the past art having both integrally attached trunk style shakers and fruit catching platforms normally have the catching platforms placed fairly low to the ground in order to clear low hanging branches, and the tree trunk shaking devices placed below the catching platforms. Harvesting machines employing trunk shakers below the catching platform are adapted to grasp the trunk of the tree just slightly above the ground level.

Trees generally continue growing as long as they live. Consequently many orchards today consist of older trees with large trunks, sometimes as large as 15 to 24 inches in diameter. Large trunks are particularly prevalent with walnut and pistachio trees. A trunk shaker on harvesters of the type employing fruit catch platforms and off-load conveyors currently have a difficult time grasping a large tree trunk near the ground and applying sufficient vibration to strip all the fruit from the tree without either damaging the tree trunk or the root system of the tree. A tree trunk is significantly restrained from moving by the earth around the base of the tree, and consequently it requires a great amount of force and vibration to grasp a tree trunk adjacent the ground and to shake the tree adequately to remove all the fruit, particularly with large tree trunks. In view of this problem, several past art devices were designed with shaking apparatuses adapted to grasp individual limbs of the tree above the fruit catch platform and shake the limbs one at a time. Others used trunk style shakers which were either incapable of reaching vertically for use on large trees, or they placed the vertically raisable trunk shaker under the catch platform (sheets) making it difficult to quickly align the shaker heads with the tree trunk. It requires time to align a shaker head either on a tree trunk or on a limb. Each alignment of the shaker heads or clamps on a limb requires additional time. Grasping and shaking three or four limbs of a tree to remove the fruit will require three or four times the amount of time required to shake just one limb or tree trunk. This was the logic behind the development of the trunk shaker over the limb shaker, time saving. Trunk shakers can save a significant amount of time over a limb shaker. However, with larger tree trunks, trunk shakers are not always able to efficiently shake all the fruit from the tree without damaging the tree, and individual limb shakers are overly time consuming.

It is apparent from my experience in building and operating nut and fruit tree harvesting equipment, and from a reading of the past art disclosures involving tree harvesters that improvements in harvesting technology are needed, and improvements can equate to major amounts of money saved during harvesting. In the following specification, my improved nut and fruit harvester will be disclosed which is significantly faster and more thorough than past art harvesters, particularly when harvesting large mature trees of pistachios and walnuts in orchards.

SUMMARY OF THE INVENTION

In practicing my invention, I have developed an improved double section, self-propelled harvester for rapidly harvesting nuts and fruits from trees. Each of the harvester sections has an elongated wheel supported frame adapted for operation between rows of trees. The harvester sections are driven forward in a straight line down the rows of trees with one harvester on each side of the row of trees to be harvested. Each diesel engine powered, steerable section has a fruit catch platform sloping toward an off-load conveyor system and tree trunk seal. The seals and off-load conveyor systems are adapted for placement adjacent a tree during harvesting. The hinged trunk seals are adapted to seal between the harvester sections and around the base of the tree to prohibit loss of produce. The off-load conveyors carry the produce for deposit into hauling trailers attached to each section of the harvester. Fruit boxes can be used in a slightly modified embodiment of my harvester if desired. The preferred hauling trailers are of the type taught by Compton in U.S. Pat. No. 4,844,683 having a hydraulic motor to drive the wheels of the trailers, and which are structured to dump the produce out the bottom of the trailer into a pit or loading elevator. Quick connect hydraulic lines extending from a hydraulic pumping station of the harvester are used for powering the hydraulic motor of the preferred hauling trailers. With power assisted wheels on the trailers, the trailers can be extra large, being much longer than conventional towed trailers used in orchards. Normally orchard harvesters would not be able to pull such a large capacity trailer when fully loaded for lack of traction. With the use of these power assisted trailers, the overall traction of the harvester can be supplemented. As the power assisted trailer is filled, the additional weight of the crop adds traction to the hydraulically powered wheels of the trailer. Under some conditions the power assisted trailers actually push the harvester when the harvester looses traction in the loose or muddy soil of an orchard. My harvester used in combination with this type of power assisted trailer is capable of harvesting much larger quantities of produce without having to stop and take the time to either unload fruit boxes which fill-up quickly, or to disconnect a loaded standard sized trailer and connect an empty trailer. This allows continued uninterrupted harvesting of many trees before the time consuming process of unloading the harvested crop is necessary. When the power assisted trailers do become full, a hydraulically powered hitch attached to each of my harvester sections is adapted to lower and release the hitch of the trailer on the ground, and then extend by telescoping outward to reconnect to an empty trailer. However, the preferred hauling trailer has a hitch at each end to allow connection of a tractor to one hitch of the trailer before disconnecting the oppositely disposed hitch from the harvester. Double hitches on hauling trailers are important with such a large amount of weight involved. A standard towable hauling trailer may be used if desired.

One of my harvester sections is equipped with a self-centering trunk style shaker adapted to reach out and grasp the trunk of a tree and vibrate it to remove all the fruit therefrom without damaging the treee. The fruit falls onto the sloped catch platforms, rolls into the conveyors and is deposited into the hauling trailers. The trunk shaker is positioned above the tree trunk seals of the harvester at the lower side of the sloped catch platform generally centered in the harvester section and in clear unobstructed view of the operator to allow quick alignment with a tree trunk. My trunk shaker has the ability to extend and retract horizontally for shaking the trunk of a tree slightly above the seal between the two sloped catch platforms. Retraction of the shaker apparatus is necessary to be able to drive by a tree to the next tree in the row. The trunk shaker also has the ability to extend vertically at an angle to reach high up on the trunk of a large tree for grasping the trunk just below the normally present cluster of main branches extending from the trunk of the tree. When a large tree is clamped and shook at the upper end of the trunk just below the main branch cluster, it requires significantly less clamping and vibration force than to grasp the trunk of the tree near the ground where the tree is held generally stationary by the earth. A difference of just three or four feet in elevation of the trunk shaker on the trunk of a tree has been found to give significant changes in the ability of a shaker to effectively remove the crop from the tree without damaging the cambium layer of the trunk. With the shaker clamped about the tree high up on the main trunk, complete removal of the produce can be accomplished without damage to the trees and without the significant amount of additional time required to use individual limb shakers.

Under some conditions, depending on the size of the tree trunks of the orchard being harvested, my shaker apparatus is extended horizontally straight out to grasp and shake the tree trunk about two feet off the ground, just above the trunk seals of the harvester. This clamping position is generally reserved for the trees having smaller trunks, and is preferred when possible since it is fastest to extend the shaker apparatus straight out rather than outward and upward. When harvesting trees with extra large trunks, the shaker apparatus is extended at an angle upwards to grasp the trunks up high. The angle of extension is selectable to allow the operator to position the pads of the shaker apparatus at a optimum height just below the main branch cluster of a tree. The height of the main branch cluster of each tree does vary somewhat from tree to tree even in an orchard of trees all approximately the same age, and therefore it is important that the operator have a range of control over the movement of the shaker apparatus. My harvester has the ability to rapidly and thoroughly harvest both large or small trees in either very large orchards or smaller ones without causing damage to the trees.

It is therefore a primary object of my invention to provide a harvester adapted to rapidly remove nuts and fruits from trees, catch the produce before it hits the ground, and place the caught produce in either hauling trailers or boxes.

It is a further object of my invention to provide the above in a harvester having the ability to remove all the produce from large trees without causing damage thereto.

It is a still further object of my invention to provide the above in a harvester having a trunk style shaker capable of shaking both large and small trees to rapidly remove all produce therefrom without damaging the trees.

It is yet still a further object of my invention to provide the above in a harvester capable of quickly harvesting large orchards with extended periods of time between harvested produce unloading stops through the use of power assisted hauling trailers.

It is a still further object of my invention to provide the above in a harvester which is quick to align with each tree to be harvested in a row of trees by being structured to be able to be driven in a straight line during the harvesting process without the need for backing up between trees.

The many other advantages and objects of my invention will become apparent to those skilled in the art with a reading of the remaining specification and a subsequent comparison with the appended drawings showing the preferred embodiments of my improved nut and fruit harvester.

BRIEF DESCRIPTION OF THE DRAWINGS

FIG. 16 illustrates a fruit box holding platform used to collect the produce when a hauling trailer is not used. The box holding platform attaches to the hitch of my harvester.

FIG. 17 shows the rear end of a harvester section which has been adapted to support fruit or nut boxes rather than use a hauling trailer.

DESCRIPTION OF THE PREFERRED EMBODIMENTS

Figure 1:
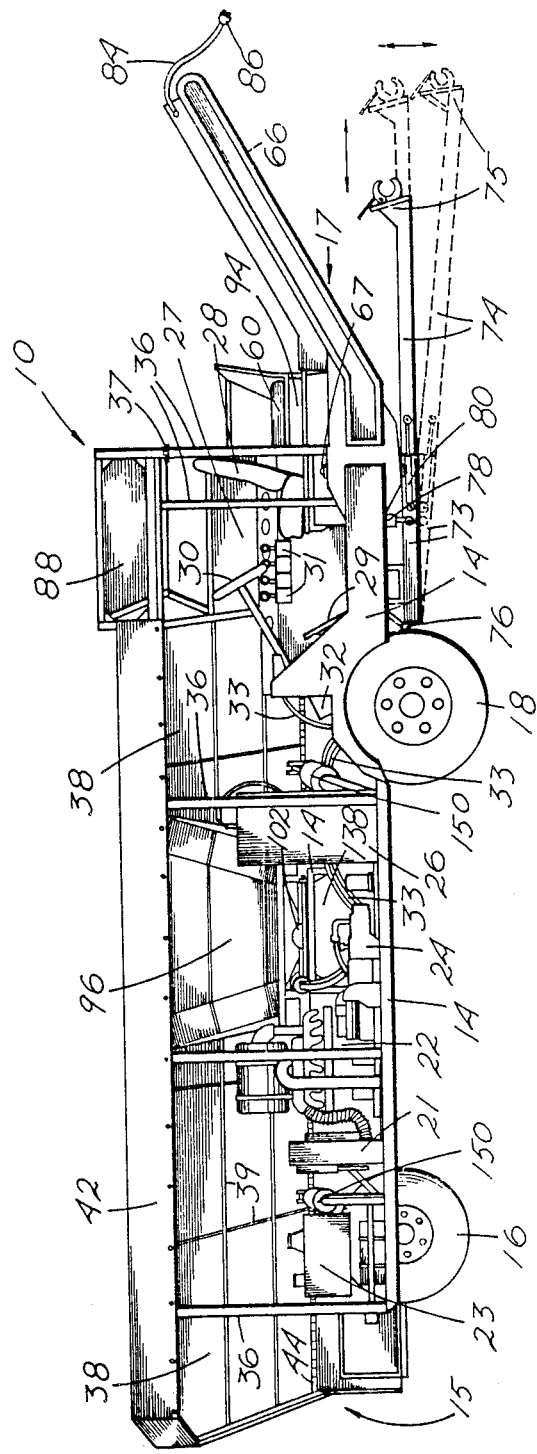
FIG. 1 illustrates one side of the first section of my harvester having the trunk shaker apparatus.

Referring now to drawing FIGS. 1 through 15 where the preferred embodiment of the immediate invention is illustrated. The complete harvester is comprised of two completely separate driveable harvester sections designated first harvester section 10 and second harvester section 12. The harvester sections 10 and 12 are adapted to be used together to form the complete harvester. The harvester sections are structured in a left and right half arrangement to allow the harvester drivers or operators 13, one operator 13 per harvester section to be on opposite sides of a tree, facing in the same direction, with both catch platforms 38 sloped toward the tree to form a V-shaped produce catching platform under the limbs of a tree for harvesting. Each section 10 and 12 are of sufficiently narrow width to allow driving with the front end 15 forward generally in a straight line between the rows of trees in an orchard, and sufficiently low in profile to clear the larger low hanging branches.

Figure 3:
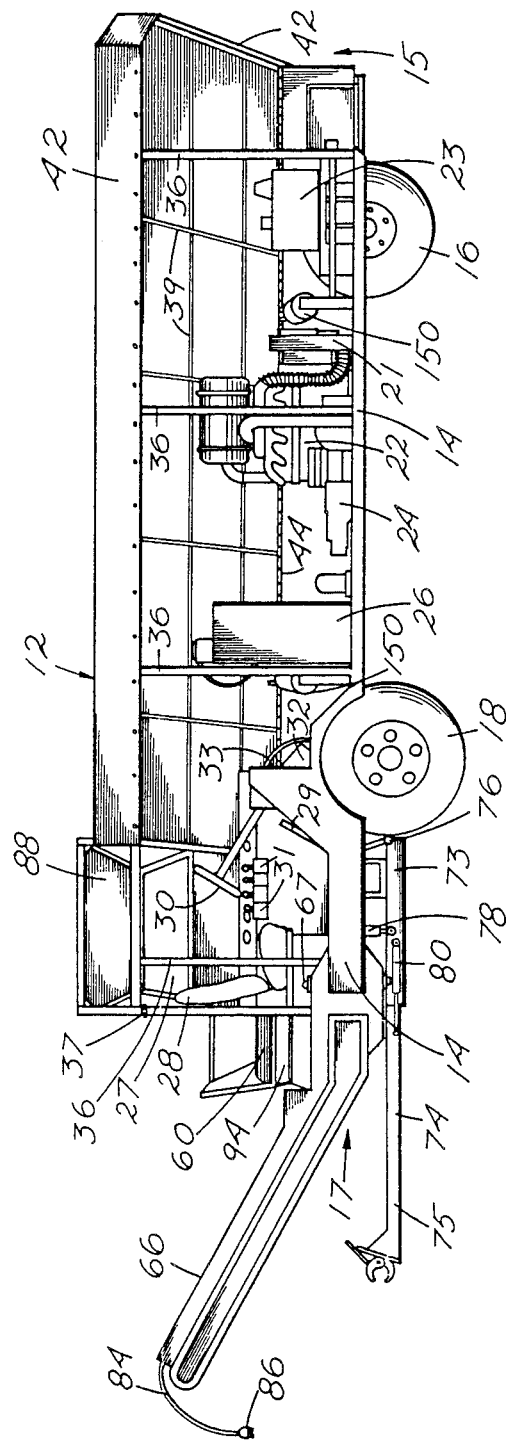
FIG. 3 illustrates one side of the second section of my harvester.
Figure 7:
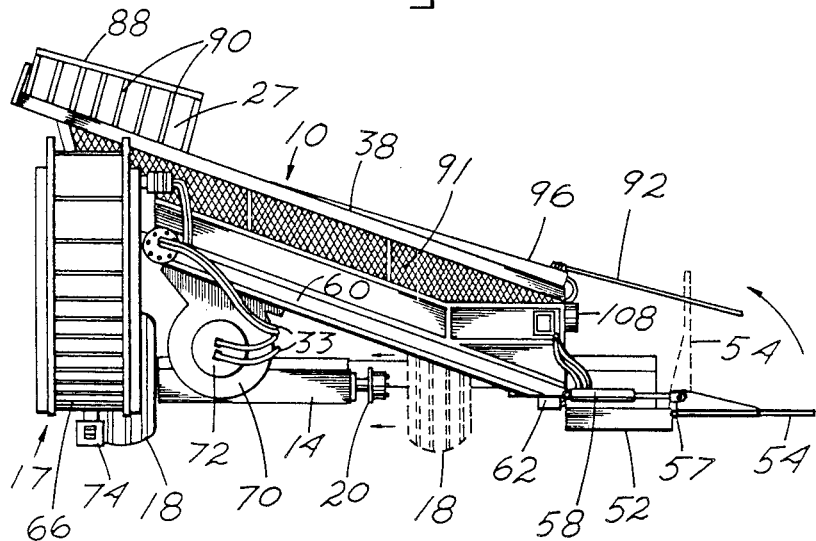
FIG. 7 is a rear end view of the first section of the harvester.

Both harvester sections 10 and 12 are structured similar to each other beginning with a rectangular steel support frame 14 supported by three wheels per frame 14 of each section. The single front wheel 16 of each section 10 and 12 is attached to wheel support structure to allow steering of the harvester section, and the two rear wheels 18 of each section 10 and 12 are powered by way of hydraulic motors 20 and wheel hub attached gear boxes, one motor 20 per wheel 18 for rotating each wheel 18 to propelled the harvester sections along the ground. Each motor 20 is reversible to allow the harvester sections 10 and 12 to be driven in reverse when desired. The control for both motors 20 on each harvester section is preferably a foot pedal 29 activated hydraulic valve located in a driver's cab 27. Foot pedal 29 is shown in FIGS. 1 and 3. Foot pedal 29 is pivotally attached centrally to a support arm and functions as a "rocker" style control for the valve. Pressing foot pedal 29 at the top causes both motors 20 to move the harvester section forward, while pressing foot pedal 29 at the bottom causes both motors 20 to move the harvester in reverse. FIG. 7 shows one wheel 18 removed to illustrate the hydraulic motor 20 with attached gear box which rotates the wheel 18.

Attached to the frame 14 of each section 10 and 12 is a water cooled diesel engine 22 and cooling radiator 21 therefore. Engine 22 supplies the operational power for the harvester section, and a diesel fuel supply tank 23 supplies fuel to the engine 22. Attached to engine 22 is a hydraulic fluid pressuring or pumping station 24 for powering all of the hydraulic motors and hydraulic rams on that particular section 10 or 12. Hydraulic fluid supply lines extend from pumping station 24 up to the various manually activated hydraulic controls 31 located in the driver's cab 27. From controls 31 in cab 27, hydraulic lines, generally designated 33 connect to the various hydraulic motors and rams of the harvester section 10 or 12. Connected to pumping station 24 is a hydraulic fluid supply reservoir tank 26 adapted to retain hydraulic fluid not currently in the hydraulic lines, devices or pumping station 24.

The operator's cab 27 of each harvester section 10 and 12 is positioned at what is considered the rear end 17 of the harvester section. Within each cab 27 is a operator's seat 28, a steering wheel 30, both foot and hand actuated controls 29 and 31 for operating all of the various hydraulic rams and motors on the harvester section, and controls for diesel engine 22. The functions of the harvester which must be controlled or regulated by the operator 13 are positioned within reach for an operator 13 sitting in cab 27. Steering wheel 30 is attached to a commercially available hydraulic steering box 32. Steering box 32 is attached to a set of hydraulic lines to the hydraulic pumping station 24. The hydraulic lines extend from steering valve 32 to a hydraulic ram 34 attached to the support structure of front wheel 16. Hydraulic ram 34 is attached at one end using a cam arrangement to front wheel 16 and at the opposite end to frame 14 as shown in the cut-away of FIG. 5 and in the front view of FIG. 6. When ram 34 is either extended or retracted by way of activation of steering box 32 through rotation of steering wheel 30, front wheel 16 pivots to steer the harvester section 10 to 12.

Figure 8:
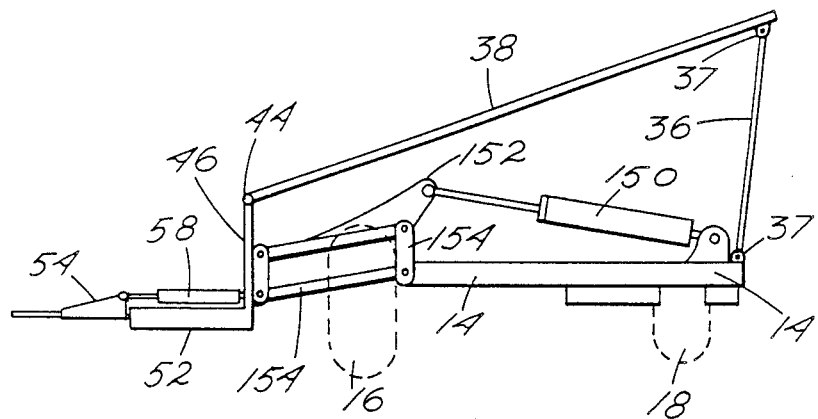
FIG. 8 is a simplified illustration of either the first or second harvester sections in an end view showing the hinging and powering hydraulic ram for lifting the lower side of the catch platform with attached conveyor and seal panel. The catch platform is shown in the lowered position.
Figure 9:
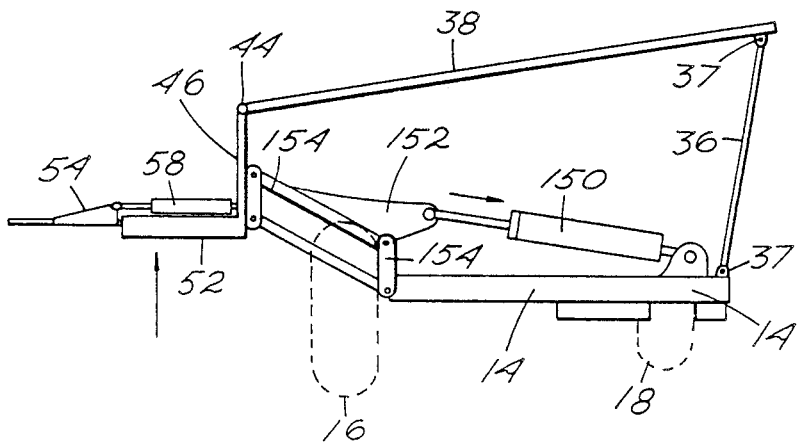
FIG. 9 is a simplified illustration of the lower side of the catch platform with attached conveyor and seal panel in the raised position.

Also common to both harvester sections 10 and 12 are a plurality vertical posts 36 which support the upper or higher lengthwise side edge of catch platform 38. Each post 36 is pivotally attached to the lengthwise outside edge of frame 14 at the lower end of the post 36. Each post 36 is pivotally attached at the upper end to the lengthwise outside edge of a support framework 39 which supports catch platform 38. In FIG. 8 and 9, 37 designates the pivotal attachments of posts 36. The pivotal attachments 37 of vertical posts 36 are adapted to allow raising and lowering of the lower lengthwise side edge side of catch platform 38 to be discussed further later.

Figure 4:
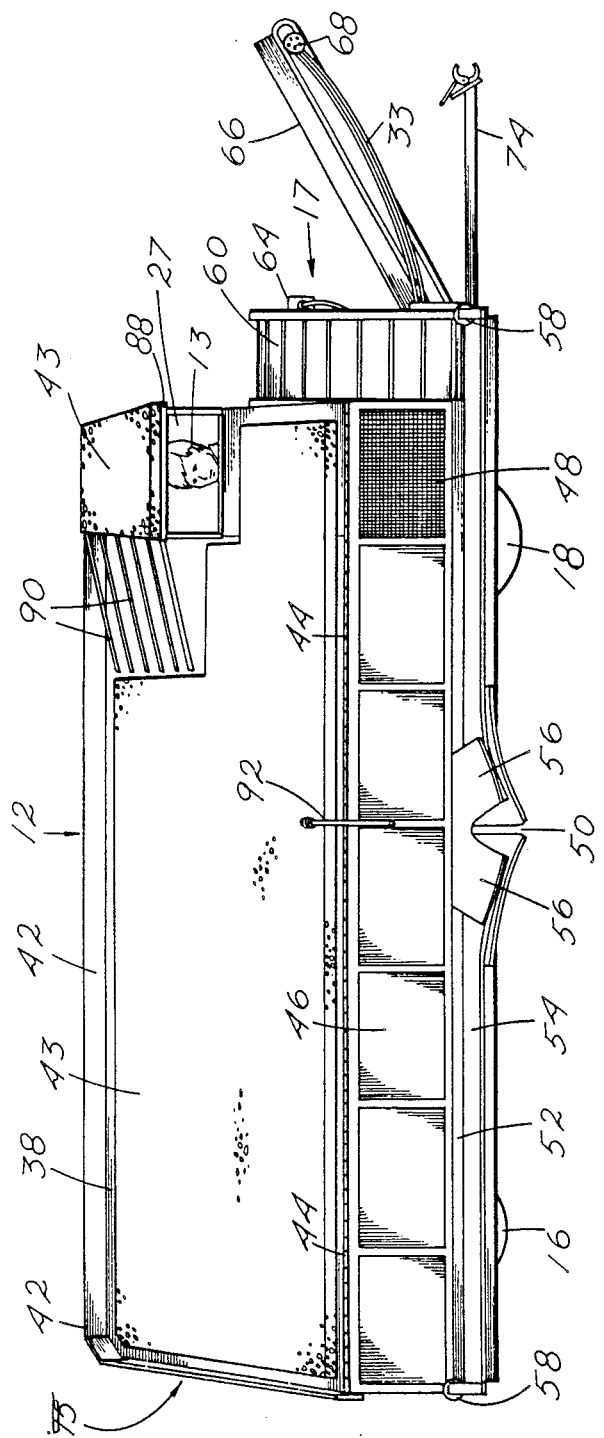
FIG. 4 illustrates the oppositely disposed side of the second section of the harvester shown in FIG. 3.
Figure 15:
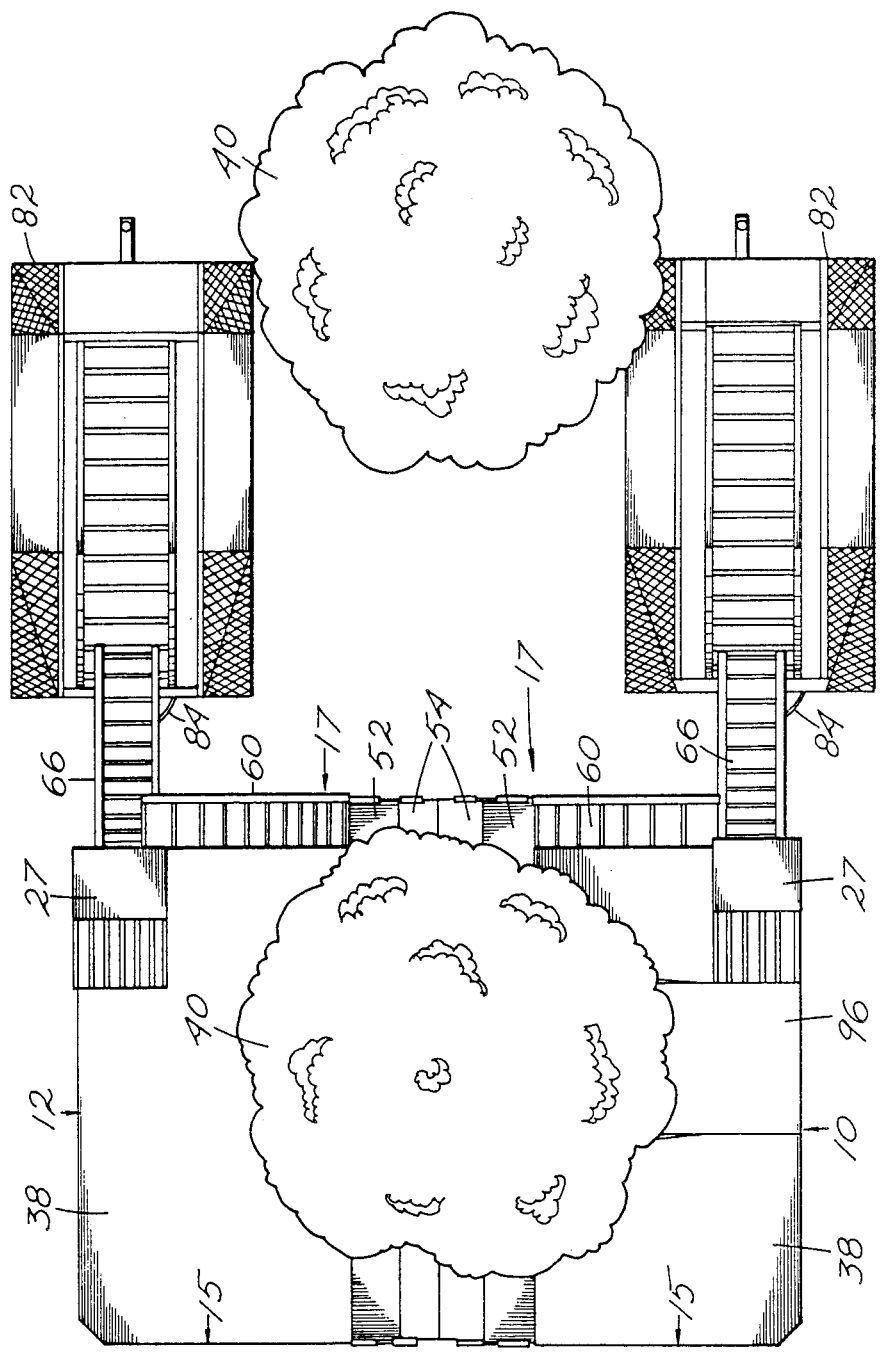
FIG. 15 shows a top view of both the first and second sections of my harvester in the process of harvesting produce from tree. Each harvester section is shown attached to a power assisted hauling trailer.

Each catch platform 38 is a rectangular panel of sheet metal covering substantially the entire top of all of the section 10 and 12 as shown in the drawings. The grid-like support framework 39 made of welded metal bar and angle-iron supports catch platform 38 on the underside as shown in FIG. 1 and 3. Catch platform 38 is sloped from the high side of the platform 38, downward toward the lengthwise lower inward side of the harvester section. It is the lengthwise inward side of the harvester section 10 or 12 which is placed adjacent a tree 40 during harvesting as shown in FIG. 15. Catch platform 38 is adapted to serve as a landing surface for nuts and fruit falling from a tree 40 during harvest. Since some produce, particularly nuts have a tendency to bounce upon striking catch platform 38, a short rim wall 42 is attached to the upper lengthwise edge and the front edge of catch platform 38 to serve as a backstop to prohibit the produce from bouncing off of platform 38. Catch platform 38 slopes to cause produce landing on the platform to roll or slide off the lower side of platform 38. Catch platform 38 of both sections 10 and 12 are sized when placed together with a tree centered between the two harvester sections to catch all the produce dropping from the tree 40. For nut harvesting, catch platform 38 is used with the sheet metal exposed. For harvesting fruit which bruises easily, such as peaches or prunes, a layer of soft resilient foamed or expanded plastic 43 is adhered to the upper surface of the platform 38 and the top of cab 27 in order to cushion the impact to the falling fruit as shown in FIG. 4.

Figure 2:
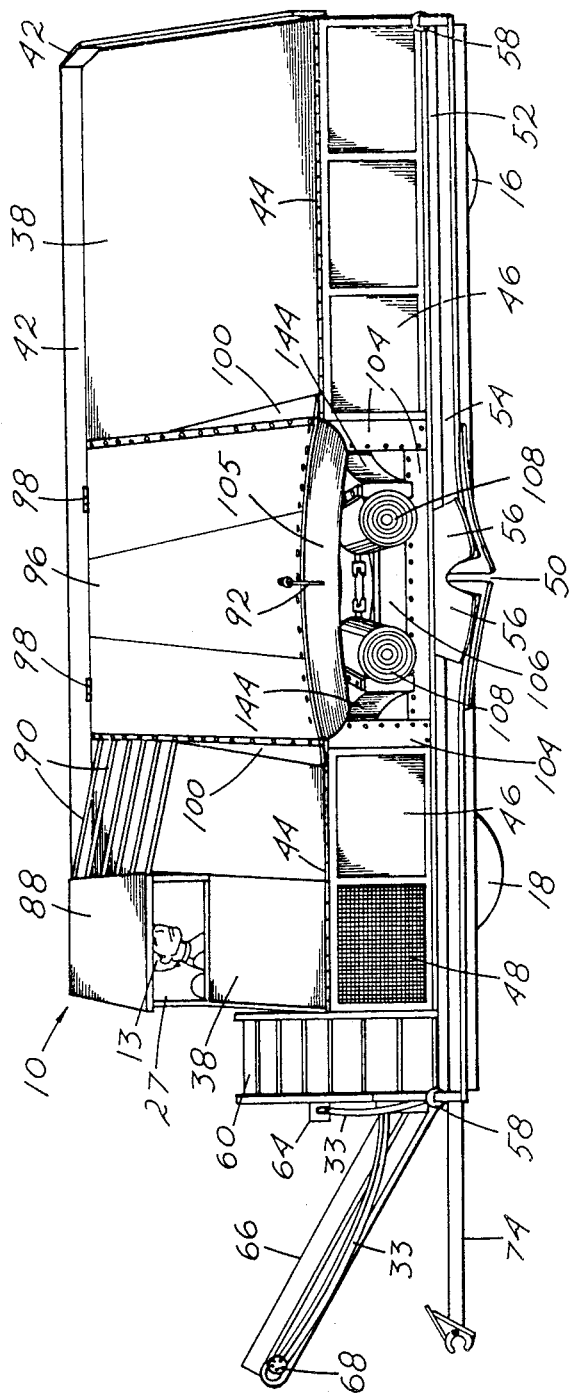
FIG. 2 illustrates the oppositely disposed side of the first section of the harvester shown in FIG. 1. The shaker apparatus is shown retracted above the notched trunk seal in the center of the harvester.

Attached to the lower lengthwise side edge of catch platform 38 as shown in FIG. 2 is a hinge 44 extending generally the full length of catch platform 38. Attached to the opposite side of the hinge 44 is a vertically oriented metal panel 46 extending generally the full length of catch platform 38. One short end section of metal panel 46, at the rear end 17 of each section 10 and 12 is an expanded metal screen 48 which serves as an air intake for a debris blowing fan 70 which will be explained in greater detail later.

Figure 6:
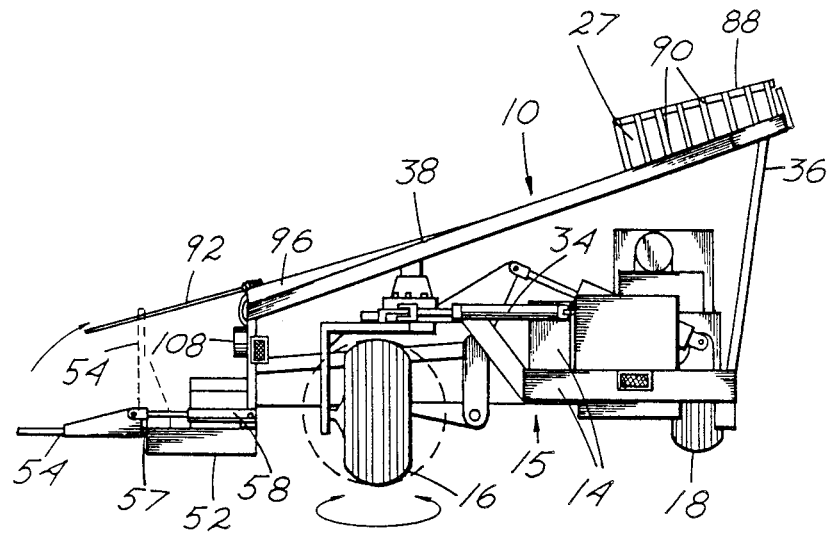
FIG. 6 is a front end view of the first section of the harvester.

Attached to the lower edge of panel 46 is a horizontally disposed conveyor belt and support frame for the belt, designated horizontal conveyor 52. Conveyor 52 is adapted to carry nuts and fruit which fall thereon, primarily falling from catch platform 38, towards the rear 17 of the section 10 or 12. Horizontal conveyor 52 extends the full length of panel 46 and catch platform 38, and is powered by hydraulic motor 62 shown in FIG. 7. Hingedly attached to the lengthwise side edge of horizontal conveyor 52, opposite the edge of conveyor 52 which is adjacent panel 46 is a flat rectangular metal panel designated seal panel 54 as shown in FIG. 6 and 7 attached with hinge 57. Panel 54 is desirably covered with a thin layer of rubber-like padding to cushion the impact of the falling produce. In the center of seal panel 54 is a notch 50 open to the outside edge of the panel 54. Notch 50 is sized large enough to accept even the largest of tree trunks normally encountered. Notch 50 is surrounded with flexible resilient panels 56 extending inward covering a portion of the opening of the notch 50 forming a tree trunk seal adapted to self-adjust to snugly fit a variety of sizes of tree trunks 41. Seal panel 54 is further affixed with two hydraulic rams 58, one ram 58 on each end of panel 54. One end of the rams 58 are attached to panel 46, the opposite end of rams 58 are attached to seal panel 54. Rams 58 are attached to seal panel 54 and panel 46 in a manner to allow placement of panel 54 vertically oriented with a simultaneous retraction of the rams 58, and horizontally oriented with an extension of rams 58 as shown in FIG. 6 and 7. Both rams 58 are desirably controlled by a single control lever in cab 27 to synchronize movement of the rams 58. During harvesting, each harvester section 10 and 12 are driven closely along opposite sides of a tree 40, with the seal panel 54 of each section 10 and 12 in the vertical position. While driving forward, the tree is aligned with notch 50 in tree seal 56 by the operator 13 with the aid of a flexible alignment rod 92 which extends outward from the center of each catch platform 38 above notch 50. In the case of harvester section 10, alignment rod 92 extends from panel 96 outward over notch 50. Panel 96 will be explained further later. When the operator 13 abuts rod 92 against a trunk 41 of a tree 40, notch 50 is aligned with the trunk 41 of the tree. The operator 13 on each harvester section then actuates a control lever in cab 27 which extends rams 58 to lower seal panel 54 into a horizontal plane. Notch 50 slips around the tree forming a tight seal therearound by way of the self-adjusting flexible material 56 surrounding notch 50. Seal panel 54 of one harvester section will overlap the seal panel 54 of the other harvester section to close the space between the tree, the two harvester sections 10 and 12, and the ground. After harvesting of the tree 40, the seal panels 54 are moved back into the vertical position to allow driving of the harvester forward in a straight line beyond the harvested tree to the next tree in the row. Any produce resting on the seal panels 54 is dumped onto conveyor 52 when the panels 54 are raised to the vertical position. The alignment rod 92 is flexible enough to bow around the tree as the harvester is driven past to the next tree to be harvested. The rod 92 snaps back into place after passing the tree. When the operators 13 lower or raise seal panels 54, each operator 13 must be aware of a proper order for moving the panels 54 in order to avoid a collision of the two panels 54 which are structured to overlap each other.

Figure 5:
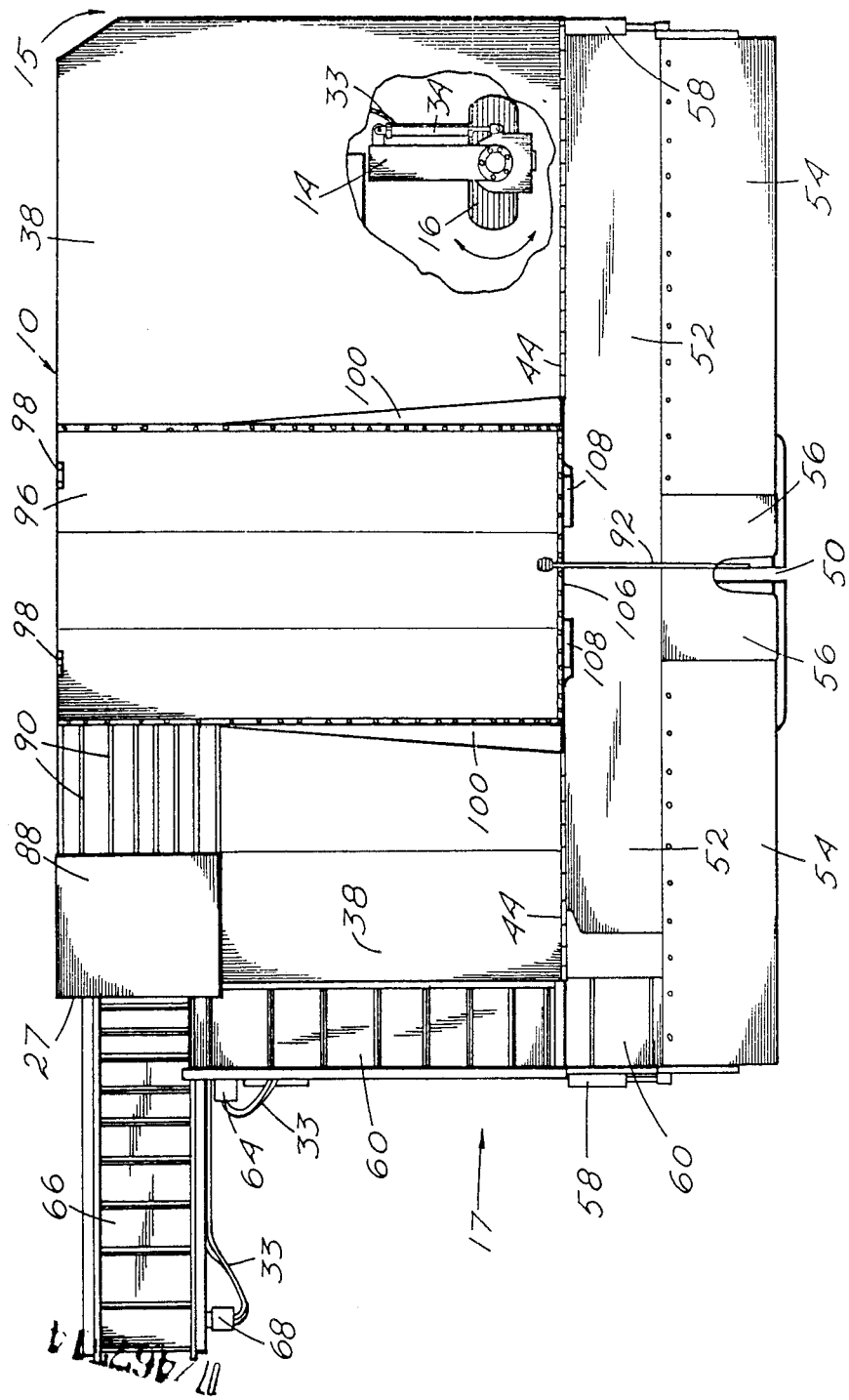
FIG. 5 illustrates the first section of the harvester in a top plan view.

The horizontal conveyor 52 is adapted to move produce toward the rear end 17 of each harvester section 10 and 12, where the produce is picked-up by a conveyor 60 attached to each harvester section. Conveyors 60 are attached across the rear end 17 of each harvester section 10 and 12 at a vertically inclined angle with the lower end of each conveyor 60 aligned to receive the produce from the horizontal conveyor 52 of that particular harvester section as shown in FIG. 4 and 5. The conveyors 60 are each attached to the portion of catch platform 38 and horizontal conveyor 52 which is raisable and will be explained in more detail later. Each conveyor 60 is powered by a hydraulic motor 64 shown in FIG. 5 and controllable from within cab 27. Produce is carried by conveyor 60 upwards and towards an off-load conveyor 66 on each harvester section. Off-load conveyor 66 is removably bolted with bolt 67 to the rear end of frame 14. Conveyor 66 is also placed at a vertically inclined angle with the lower end of the conveyor adjacent frame 14, and the higher end farthest from the frame 14 as shown in FIG. 1. Conveyor 66 extends lengthwise in parallel alignment with the length of harvester section 10 or 12. Each off-load conveyor 66 is powered by hydraulic motor 68 and is controllable from within cab 27.

There is a space or distance between the upper end of conveyor 60 and the lower end of off-load conveyor 66 which produce must fall through when moving from conveyor 60 to conveyor 66. Positioned below conveyor 60 is fan 70 which receives most of its intake air through screen 48 in panel 46. The air discharge duct 94 of fan 70 is placed to discharge a volume of air through the space between conveyor 60 and conveyor 66 which the produce must fall through when moving from conveyor 60 to conveyor 66 as shown in FIG. 1 and 3. The discharged air helps clean the produce by blowing leafs, dust, nut hulls and other articles which are lighter than the produce out over the outer edge of conveyor 66 and onto the ground. Discharge duct 94 and fan 70 are each also attached to the portion of the catch platform 38 which can be raised. Each fan 70 is powered by hydraulic motor 72 and is controllable from within cab 27. During harvesting, conveyor 52, 60, 66 and fan 70 continue to operate and off-load produce even with seal panel 54 in the vertical position and the harvester in the process of moving to the next tree in the row. There is no need to wait for all the produce to be off-loaded from the conveyors before moving to the next tree since none of the produce can fall off of the harvester.

As shown in FIG. 1 attached below conveyor 66 is a telescoping trailer hitch 74 adapted at the distal end section 75 for attachment to a hitch on a hauling trailer 82. Hitch 74 is primarily structured as a tubular double section telescoping arrangement. A first section 73 of hitch 74 is hingedly attached by hinge 76 to frame 14 adjacent one rear wheel 18 below cab 27 and extends in lengthwise alignment with off-load conveyor 66 which is slightly off-center of each harvester section. A hydraulic ram 78 is attached at one end thereof to frame 14 and at the opposite end to first section 73 of hitch 74. Ram 78 is adapted to pivotally raise and lower hitch 74 allowed by hinge 76 as shown in FIG. 1. Attached to the first section 73 of the telescoping tubing is one end of a hydraulic ram 80 with the opposite end of the ram 80 attached to the second section 75 of hitch 74. Ram 80 is adapted to extend and retract second section 75 within first section 73 of hitch 74 as shown in FIG. 1 making the hitch longer or shorter. Hauling trailers 82 are heavy even when unloaded. With the ability to move hitch 74 downward onto the ground and extend it outward, the hitch of a loaded trailer 82 can be lowered to the ground and released from hitch 74, or an empty trailer 82 having the hitch resting on the ground can be connected to the hitch 74 without the hitch of the trailer having to be lifted to the height of the hitch 74 of the harvester section. A variety of hitching structures may of course be used on the terminal end of section 75 of hitch 74 for attaching to whatever type of hitch attachment the hauling trailer 82 may have.

Hitch 74 can be used to for towing of a standard hauling trailer, but the preferred trailer is a power assisted, belly dump hauling trailer 82 as discussed in the summary. A hydraulic line set 84 having quick connectors 86 on the terminal ends thereof, extends from the hydraulic pumping station 24 and manual controls in cab 27 of harvester sections 10 and 12 and off the distal end of the conveyor 66. Hydraulic lines 84 are adapted to be plugged into the hydraulic fluid receiver connectors on the power assisted hauling trailer 82 to power the hydraulic motor on the trailer 82. The hydraulic motor of the trailer 82 drives the trailer wheels adding to the overall traction to the harvester and its ability to haul much larger and heavier quantities of produce. If a non-power assisted hauling trailer is used with my harvester, hydraulic lines 84 can either be coiled-up and stored or removed from the harvester section. The adaption of hitch 74 to allow use of standard produce boxes 160 or bins will be discussed later in the disclosure.

As shown in the drawings, cab 27 is positioned at the rear 17 of the harvester section 10 and 12. When sitting in the harvester on seat 28, the operator's 13 head is positioned above the catch platform 38 within the upper portion of the cab 27 facing the front end 15 of the harvester section 10 and 12. The upper portion of cab 27 is open on all sides to allow viewing in all direction, and for a particularly clear view of the shaker 102 by operator 13. The upper portion of cab 27 has a roof panel 88 at a higher elevation than catch platform 38 adapted to protect the operator 13 from being struck by falling produce. The front side of the upper portion of cab 27 facing the front end 15 of the harvester section has a plurality of closely spaced bars 90 extending from roof panel 88 to platform 38 which can be viewed through, but prohibit low hanging limbs from hitting the operator 13. The backside of cab 27 is generally open, and most of the rear end 17 of each harvester section 10 and 12 is covered with expanded metal or screen 91 as shown in FIG. 7 to allow the operator 13 to view the conveyors 60, 66, and the off-loading of produce into trailers 82 or boxes 160 during harvesting. Screen 91 is also attached to the portion of catch platform 38 which can be raised.

Referring now mainly to drawing FIGS. 8 and 9 which are greatly simplified views of front end 15 generally applicable in principle to both harvester section 10 and 12 to illustrate the raising and lowering of one side of catch platform 38. In FIG. 8, frame 14 is shown supported by front wheel 16 on the left, and one rear wheel 18 at the rear, with the second wheel 18 blocked from view by front wheel 16. Attached to frame 14 on the left of the drawing is a hydraulic ram 150. As shown in FIG. 1, two rams 150 are used per harvester section 10 and 12, one ram 150 on each end of the harvester sections 10 and 12. Both rams 150 are attached to frame 14 at one end of the ram 150, and the opposite ends of each ram 150 are attached to a levering arm 152 which is rigidly attached to a hinged framework 154. One end of hinged framework 154 is attached to frame 14, and the opposite end of the framework 154 is attached to the backside of vertical panel 46. Due to the pivotal attachments of vertical posts 36, the use of hinge 44 between catch platform 38 and vertical panel 46, and the hinge-like structure of framework 154, the lower end of catch platform 38 with attached vertical panel 46, conveyor 52, and conveyor 60 can be raised upward. A control in cab 27 operable by operator 13 simultaneously controls both rams 150. The extension or retraction of both rams 150 raises or lowers catch platform 38 and the height of the lower side of the platform 38 is selectable with the control in the cab 27. The seat 28, the steering wheel 30 and the controls in cab 27 are stationary, that is they do not move with movement of catch platform 38 up and down. Some types of trees such as walnut trees are grafted about a foot above ground level to a different type of tree root system. With grafted trees, often the first foot of the tree trunk above the ground is larger and quite irregular in shape compared to the tree trunk above the graft. With the ability to raise seal panel 54 upwards, notch 50 can be placed just above the graft line of the trunk 41 where the trunk has a smoother more regular shape allowing for an improved seal around the tree trunk 41. Also, rear wheel 18 adjacent panel 46 is placed where it is somewhat difficult to service or change with platform 38 in the lowered position. By being able to raise the lower side of catch platform 38 with its attached structures upward above the wheel 18, the wheel is simpler to change and service. As will be seen by a further reading, the hingedly attached shaker 102 used with harvester section 10 is pushed upward when catch platform 38 is raised, due to the shaker pads 108 abutting conveyor 52.

Figure 14:
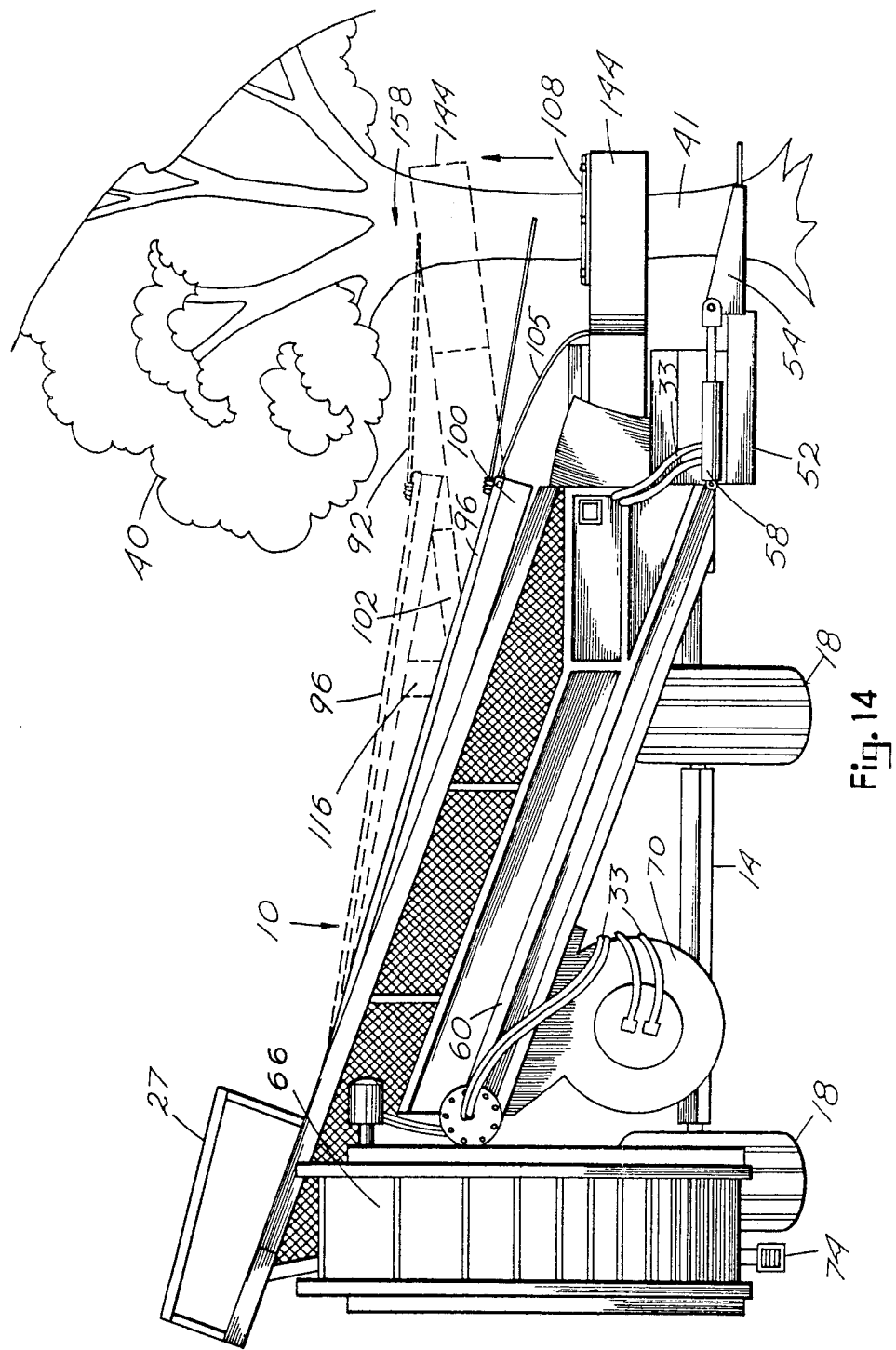
FIG. 14 illustrates the first section of the harvester a rear end view. Shown in dotted lines is the shaker apparatus and a raised hingedly attached center panel of the catch platform which allows raising of the shaker.

Referring now mainly to first harvester section 10 shown in FIG. 1 and 2 which differs from second harvester section 12 in that section 10 has the tree trunk shaker attached thereto and designated generally as shaker 102. In FIG. 2 catch platform 38 is shown with a narrow, slightly raised section of paneling in the center designated shaker panel 96. Shaker panel 96 is hingedly attached with hinges 98 to a portion of support framework 39 under catch platform 38. Shaker panel 96 functions as a sub-section of catch platform 38, and is raisable on hinges 98 upwards above platform 38 to allow the raising of shaker 102 as shown in FIG. 14 in dotted lines. It is the raising of shaker 102 which pushes shaker panel 96 upward, and the weight of panel 96 which bring the panel 96 back downward when shaker 102 is lowered. Attached to the two lengthwise side edges of shaker panel 96 and extending outward therefrom are resilient flexible seals 100. Flexible seals 100 are designed to spread or flatten out against catch platform 38 when shaker panel 96 is in a downward position, and to bend downward under their own weight to remain in contact with catch platform 38 when the panel 96 is raised upward. Flexible seals 100 prohibit produce from rolling through the crack formed by the raising of the panel 96 off of catch platform 38.

Figure 11:
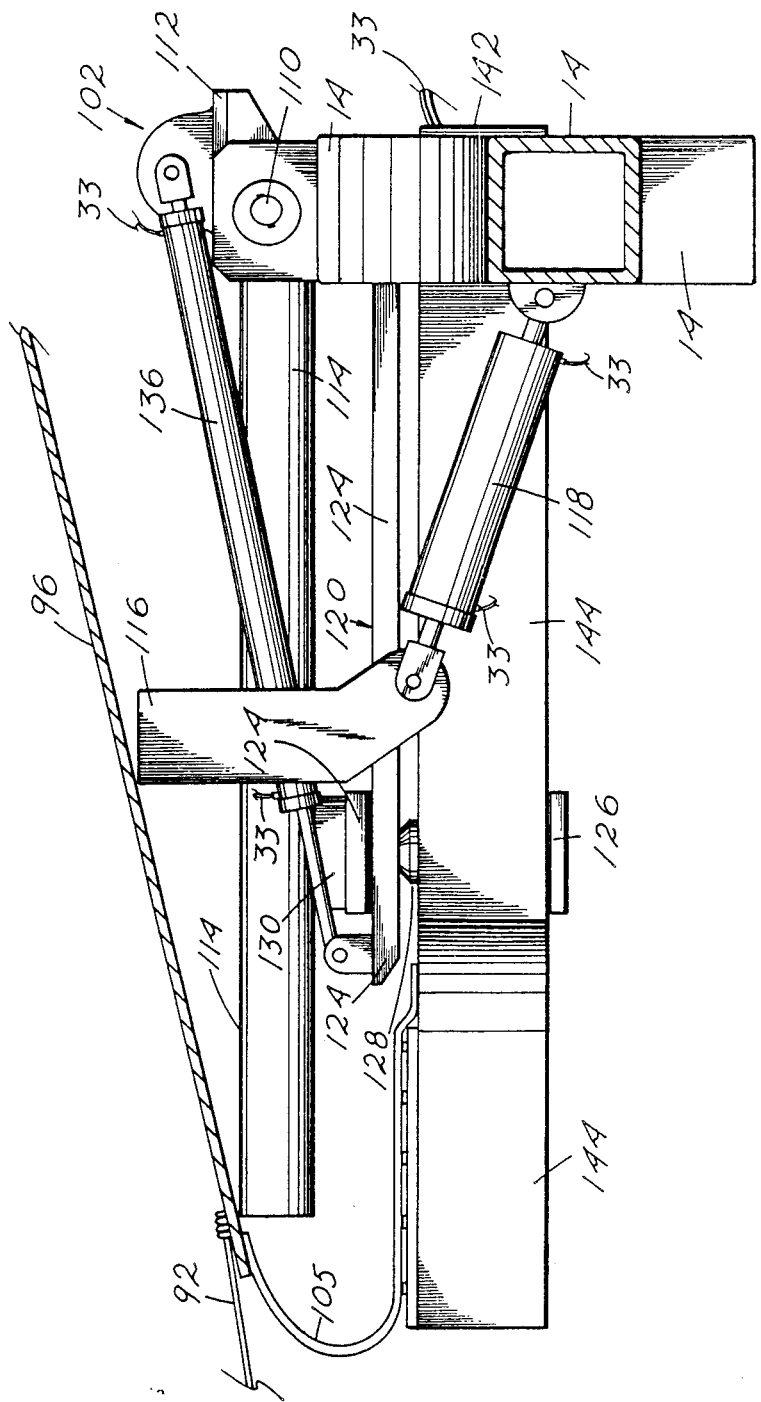
FIG. 11 is a side view of the shaker apparatus shown in FIG. 10 in the retracted position.
Figure 12:
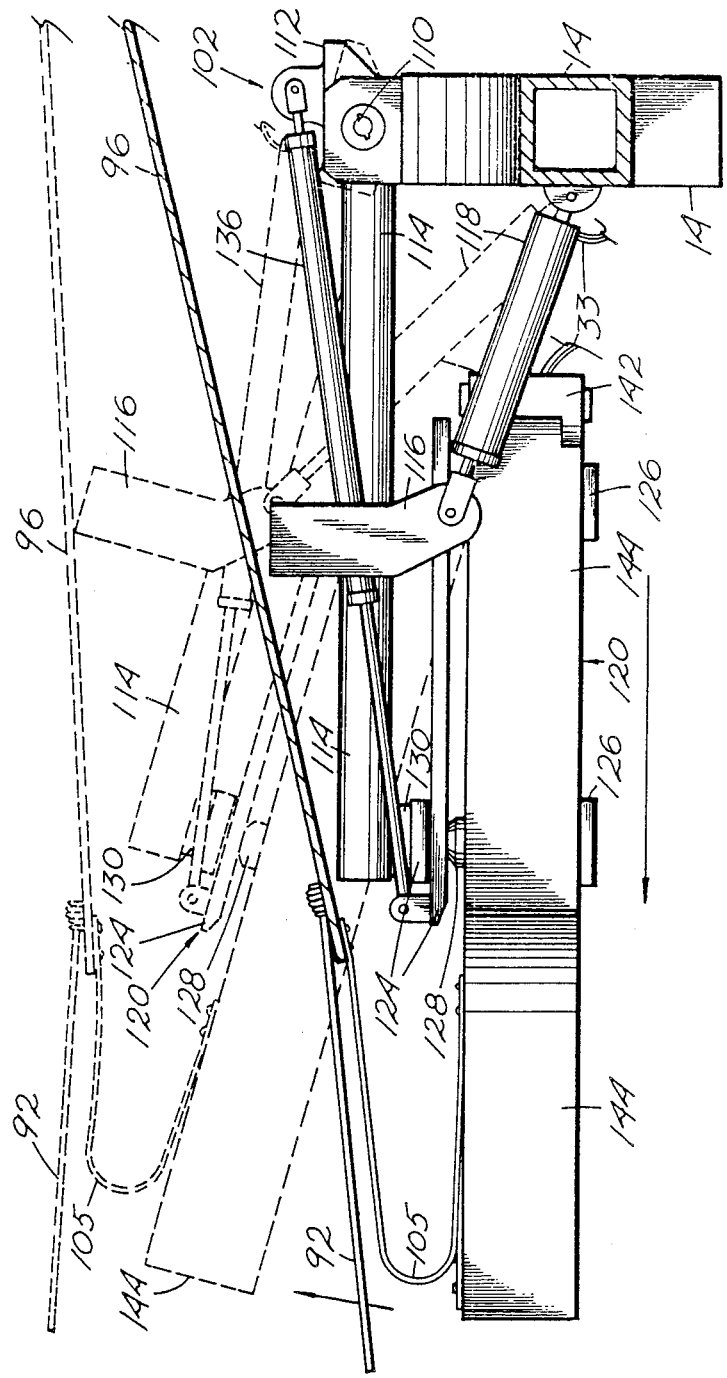
FIG. 12 shows the shaker apparatus in a side view as shown in FIG. 11 but in a horizontally extended position. In dotted lines, the shaker apparatus is shown in a vertically angled extended position.

As shown in FIG. 2 positioned directly below shaker panel 96 is the shaker 102. Shaker 102 is pivotally attached to frame 14 and partially extends outward through a shaker opening 106 in vertical panel 46 generally centrally in the harvester section 10. Resilient flexible panels 104 are attached to panel 46 on each vertical side of shaker opening 106, and a flexible panel 104 is attached to panel 46 below shaker 102. A long flexible panel 105 is attached at a first end thereof to the edge of shaker panel 96 above shaker 102, and the second end of the flexible panel 105 is attached to the tops of shaker arms 144 as shown in FIG. 11 and 12. Flexible panel 105 moves outward and inward with the extension and retraction of shaker arms 144. Flexible panels 104 and 105 maintain a seal around shaker 102 during harvesting to help prohibit produce from falling through shaker opening 106 in panel 46, yet are flexible and resilient enough to allow movement of shaker 102. In FIG. 2, shaker 102 is shown in a retracted position leaving only the two shaker pads 108 showing through the opening 106.

Figure 10:
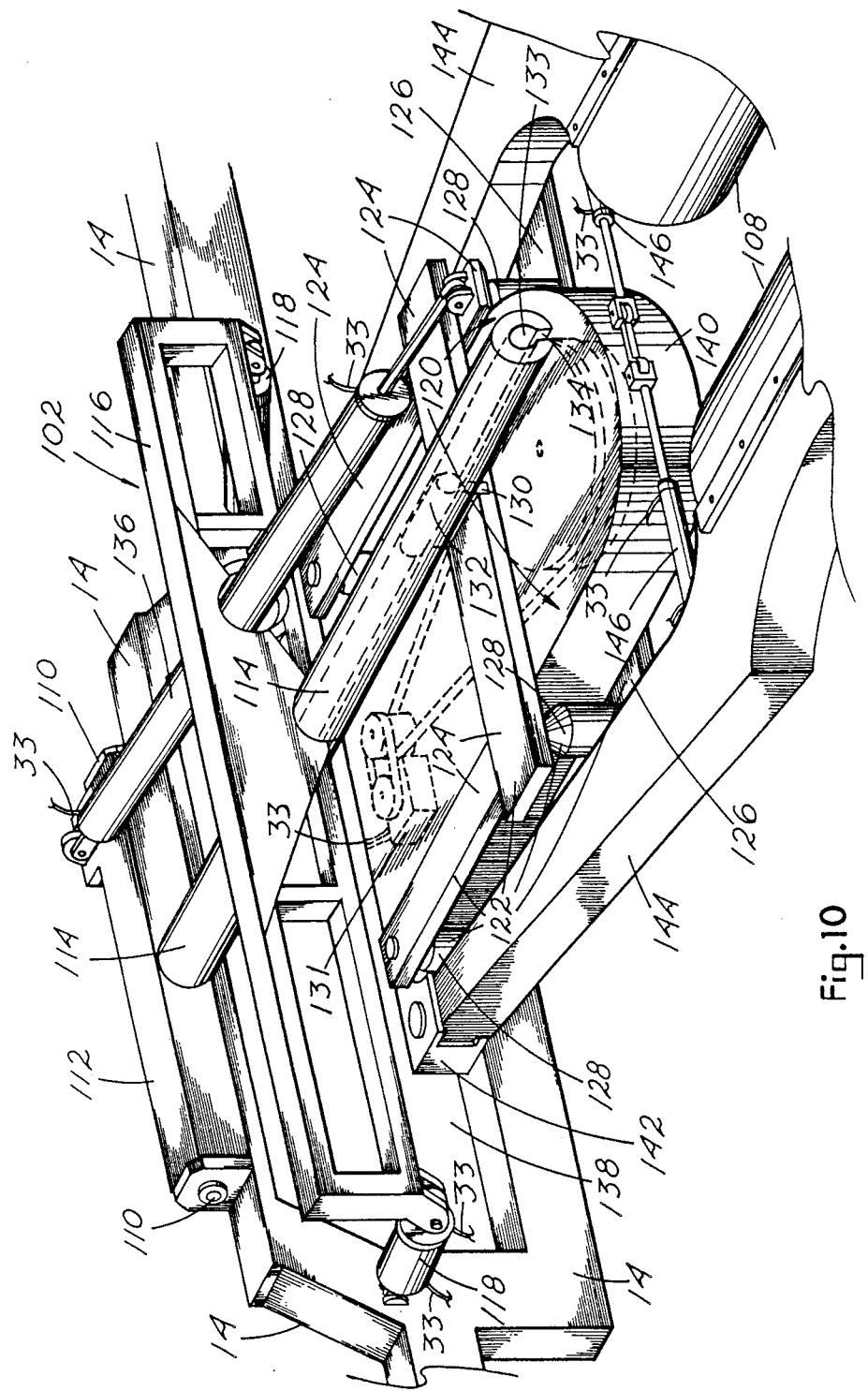
FIG. 10 illustrates the shaker apparatus of the first section of the harvester. The shaker is shown pivotally attached to a portion of the main frame of the first section and partially extended.

Referring now to FIG. 10, 11, and 12 where shaker 102 is shown in sufficient detail for those skilled in the art to understand the requirements of the shaker to properly function with my harvester. Variations in the particular structure of the shaker apparatus could be made, however, the following described shaker structure has been found to function suitably well. In FIG. 10 shaker 102 is shown pivotally attached to a section of frame 14 at two main pivots 110 located at the ends of a steel support bar 112. A steel shaker support tube 114 is welded centrally to support bar 112 and extends outward therefrom toward conveyor 52. A short distance outward from support bar 112 and securely attached to support tube 114 is a rectangular shaker support frame 116 adapted primarily to add strength to the shaker structure. Support frame 116 and support tube 114 are positioned underneath panel 96. Pivotally attached to each end of support frame 116 is a hydraulic ram 118. Rams 118 are adapted to lift or cause vertical pivoting of shaker 102 on pivots 110 as shown in FIG. 12 in dotted lines. The upper or top surface of support frame 116 is positioned to abut the underside of panel 96 to push the panel 96 upward when the shaker 102 is raised as shown in FIG. 12. Slidably attached to and supported by support tube 114 is a subsection of shaker 102 designated shaker subsection 120 which is shown partially extended in FIG. 10. Shaker subsection 120 is comprised of a frame 122 structured of an upper series of rectangular steel plates 124 attached together, and a lower series of rectangular steel plates 126 attached together. The upper series of plates 124 and the lower series of plates 126 are attached to each other by four vertical shock absorbers 128 spanning between the upper and lower plates 124 and 126 and supporting the lower portion of the frame 122. Shock absorbers 128 are adapted to reduce the transference or to isolate vibrations from lower plates 126 upward to upper plates 124, and to allow vibratory movement of the lower plates 126 during shaking. Securely attached centrally to an upper plate 124 which transverses between two side plates 124, is a short vertically oriented steel plate 130. Securely attached to the upper end of plate 130 is an elongated cylindrical rod 132 placed lengthwise horizontally oriented. Support tube 114 has a cylindrical hollow core 133 and a groove 134 lengthwise in the tube 114 extending in that portion the of tube 114 which extends beyond frame 116. Groove 134 is open from the downward side of tube 114 into the hollow core 133 of the tube 114. Cylindrical rod 132 fits into hollow core 133 and is slidably retained therein by rod 132 being larger in diameter than groove 134. Vertical plate 130 passes downward through groove 134. Groove 134 is slightly wider than plate 130 which allows a degree of sideways rolling of subsection 120 relative to support tube 114. The ability of subsection 120 to roll or tip from one side to the other allows the shaker subsection 120 to automatically adjust to angled or tipping tree trunks 41 during clamping. The entire weight of shaker subsection 120 hangs on the connection between plate 130 with attached rod 132 slidably retained in hollow core 133 and groove 134 of support tube 114. Hollow core 133 is longer than rod 132 to allow sliding of the rod 132 within core 133. A hydraulic ram 136 attaches to support bar 112 at one end of the ram, and the opposite end of ram 136 attaches to the outer most end of one upper frame plate 124 as shown in FIG. 10. Ram 136 is adapted to slide shaker subsection 120 outward with an extension of the ram 136, and to retract the subsection 120 inward with a retraction of the ram 136. Grease or other appropriate measures are applied to allow free sliding of rod 132 in hollow core 133. Frame 14 is structured with an opening 138 to allow subsection 120 unobstructed inward and outward movement as shown in FIGS. 10 and 11. Securely attached to two lower frame plates 126 is a metal housing 140. Housing 140 contains the out-of-balance shaker weights, a hydraulic motor and belts attaching the motor to the weights which cause the shaking or vibration during shaking. The vibratory mechanics are generally designated with the number 131 in drawing FIG. 10. Hydraulic fluid lines 33 which operate the hydraulic motor to rotate the shaker weights are shown existing housing 140 in FIGS. 11 and 12. Structure to cause vibration for shaking trees is well known and no further explanation should be necessary for those skilled in the art since a variety of known vibrational mechanics may be used. Securely attached to the rear end of housing 140 is a cross member 142. Pivotally attached to each end of cross member 142 is a shaker arm 144, one shaker arm 144 on each side of the housing 140. Shaker arms 144 rest on for support, but are not attached to the two transverse lower frame plate 126 which housing 140 is attached to as shown in FIG. 12. Connected at the front end of each shaker arm 144 is hydraulic ram 146, one ram 146 per shaker arm 144. Each ram 146 is attached to one shaker arm 144 at one end of the ram 146, with the opposite end of each ram 146 attached centrally to the front end of housing 140. Rams 146 are adapted to pull shaker arms 144 toward housing 140 to clamp or abut against a tree trunk with a retraction of the ram, and to push arms 144 outward with an extension of the rams 146. Attached to the terminal ends of each shaker arm 144 are the shaker pads 108 which serve as a soft contacting surface of the shaker arms 144 against the trunk 41 of tree 40. The shaker pads 108 are structured of pliable synthetic rubber and are adapted to allow high clamping pressures against the tree 40 without damaging the tree. Rams 146 operate with a single control in the cab 27 and utilize a one set of hydraulic lines to operate both rams 146. Using the single set of hydraulic lines for both rams 146 allows faster alignment of the pads 108 against the tree trunk 41. If one shaker pad 108 contacts the tree 40 before the other shaker pad 108, the non-contacting shaker pad 108 continues to move inward toward the tree 40 until both shaker pads 108 are against the trunk 41 and an even clamping pressure is applied. This is known as a self-centering shaker pad arrangement. The rams 146 then apply a high, even degree of clamping pressure to the trunk 41 of tree 40 before shaking vibrations begins.

FIG. 11 shows a side view of shaker 102 attached to the partially sectioned frame 14. The shaker subsection 120 is shown retracted partially through opening 138 of frame 14 and is in the horizontal position. The partially sectioned shaker panel 96 is in the lowered position resting on top of shaker support frame 116. The shown ram 118 and ram 136 are shown retracted. FIG. 12 shows a side view of shaker 102 attached to the partially sectioned frame 14. The shaker subsection 120 is shown extended by way of the extended ram 136. Seal 105 attached to shaker panel 96 and shaker arms 144 has move out at the lower end to follow the extension the shaker arms 144. Also in FIG. 12 is the shaker 102 shown in dotted lines with shaker subsection 120 extended and ram 118 extended to raise the shaker 102 into a vertically angled elevated or raised position. In dotted lines, shaker panel 96 is shown in the raised position, moved upward by upward movement of support frame 116 of shaker 102. For quickness in harvesting, a manually operable control located in cab 27 of section 10 and the hydraulic lines are preferably arranged so that a single lever when pushed forward causes the panel 54 to move into the horizontal position to seal around a tree 40, and for shaker subsection 120 with opened shaker arms 144 to move outward toward the tree trunk 41. After shaking, desirably, a reverse pull on the same single control lever retracts shaker subsection 120, opens or separates the shaker arms 144, and moves panel 54 back into a vertical position. Desirably, a separate control lever controls the raising and lowering of shaker 102, and another separate control lever actuates the shaker vibration motor in housing 140 of the shaker 102.

Figure 13:
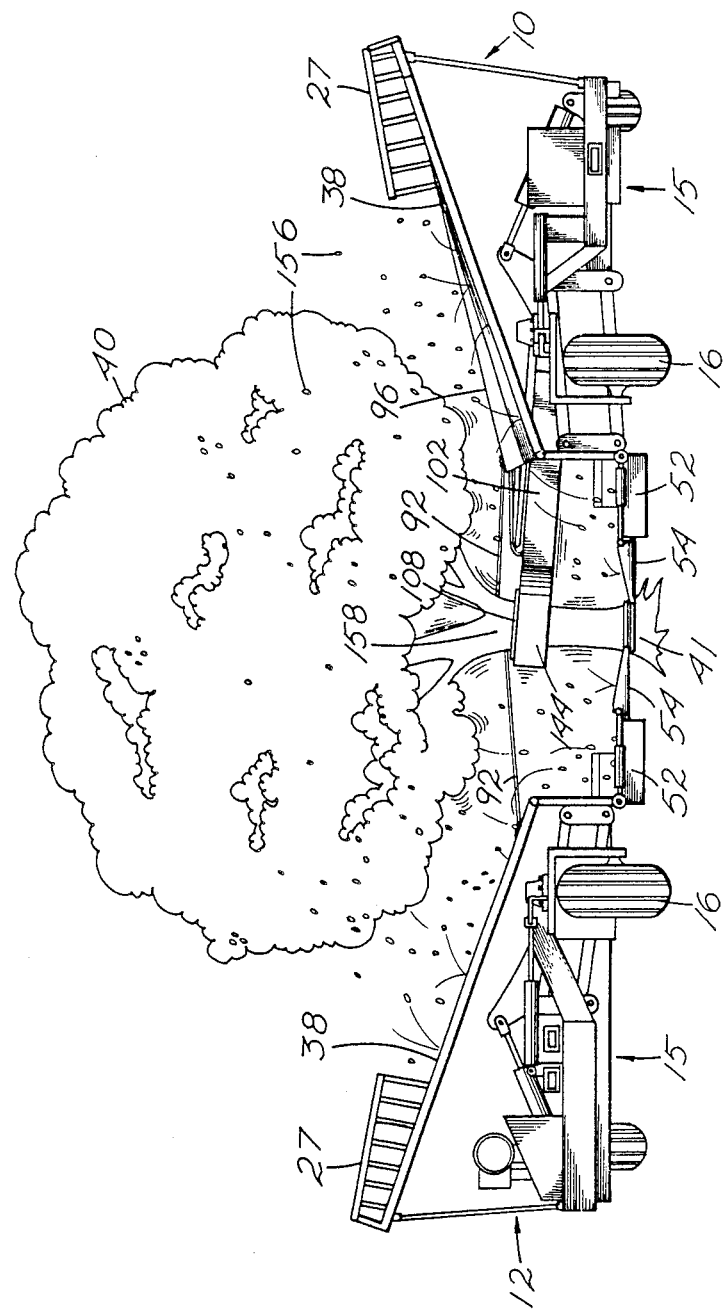
FIG. 13 shows both the first and second sections of my harvester adjacent a tree. The first section of the harvester is shown in the process of shaking nuts from the tree with the shaker in an angled upward position just below the mail branch cluster of limbs on the tree.

Referring now to drawing FIGS. 13, 14 and 15 where the harvester is shown to illustrate how it is used. The detailing of some of the parts of the harvester sections 10 and 12 have been eliminated for simplicity of the drawings. In FIG. 13 both harvester sections 10 and 12 are shown in a front end view in the process of harvesting nuts 156 from a relatively large tree 40. Both harvester sections 10 and 12 are in position on either side of the tree 40 with both of the seal panel 54 lowered into the horizontal position to seal between the two sections, the tree, and the ground. The two catch platforms 38 are shown adjacent each other forming a V-shaped platform large enough to be underneath all branches of the tree 40. Diesel engine 22, conveyors 52, 60, 66, and fan 70 all run continuously during the harvesting process. The shaker arms 144 with attached pads 108 are shown in the extended and slightly raised position clamping the tree trunk 41 adjacent the main branch cluster 158 of tree 40. The shaker 102 is shown vibrating the tree 40 and nuts 156 are being knocked therefrom. Nuts 156 are shown falling onto catch platforms 38 and falling therefrom onto conveyors 52.

In FIG. 14 harvester section 10 is shown alone to further illustrate the ability and benefits of the structuring of my shaker 102 in combination with my harvester. Although harvester section 12 is not shown in the drawing, section 12 is always used with section 10 during harvesting. In the drawing shaker arms 144 with attached shaker pads 108 are shown drawn in solid lines in the horizontally extended position clamped or abutted against trunk 41 of tree 40 above seal panel 54 but generally close to the ground. This position of the shaker pads 108 on the tree is preferred when possible because of the slightly increased rate of aligning the pads 108 with the trunk 41. However, with large trees 40, all of the nuts or fruit generally cannot be rapidly shook from the tree 40 with the shaker pads in the lower position without having to apply such a great amount of clamping and shaking force that the cambium layer of the tree 40 may be damaged. With small trees 40 the lower position of the shaker pads 108 on the trunk 41 works well. Since the shown tree 40 is relatively large, illustrated in dotted lines, shaker 102 has been raised upward quite high up on the trunk 41 just below the main branch cluster 158. On the upper position on the trunk 41, the shaker 102 is capable of supplying sufficient clamping and vibration to the trunk 41 where the trunk is not restrained from movement by the ground to remove most all if not all of the fruit or nuts from the tree 40 without damaging the cambium layer of the trunk 41. Shaker panel 96 is shown in the raised position resting on top shaker support frame 116.

FIG. 15 shows in a top view harvester sections 10 and 12 harvesting produce from trees 40 in an orchard. Each harvester section is shown attached to a power assisted hauling trailer 82. The hydraulic lines 84 are shown connected to each trailer 82. Standard towable trailers 82 could be substituted for the power assisted trailers if desired.

In a slightly varied second embodiment of the invention, each harvester section 10 and 12 are adapted to off-load produce into fruit boxes 160 carried on a modified hitch 74, rather than into a hauling trailers 82. Fruit boxes 160 are sometimes used instead of hauling trailers 82 for a variety of reasons. The most common reason is the farmer delivers his produce to processing equipment in a building for cleaning and packaging of the produce with the processing equipment being specifically set-up to function with fruit boxes 160 rather than hauling trailers 82. Sometimes the farmer does not have suitable hauling trailers 82. For whatever reason the farmer chooses to use fruit boxes 160, my second embodiment of the invention is adapted to rapidly harvest the produce of large or small trees 40 in an orchard and deposit the produce into fruit boxes 160.

FIG. 16 illustrates my fruit box support platform 162 utilized to adapt harvester section 10 and 12. One platform 162 is used on each of the harvester sections 10 and 12. In order to attach platform 162 to hitch 74, the following changes to both section 10 and 12 are made. Bolt 67 is removed to allow removal off-load conveyor 66. Hydraulic lines 84 are either disconnected from the harvester or coiled and stored underneath seat 28. The end of hydraulic ram 80 which connects to second section 75 of hitch 74 is disconnected. Second section 75 of hitch 74 is removed. The tubular attachment arm 164 of platform 162 is then slipped into first section 73 of the hitch 74 and the two pieces of tubing 73 and 164 are bolted together. This modified structuring leaves hitch 74 capable of supporting fruit boxes 160 aligned for receiving fruit from conveyor 60. Hydraulic ram 78 is used to lower the box holding platform 162 angled downward onto the ground as shown in FIG. 17 to allow slide-on placement of empty boxes 160, and more importantly to allow slide-off removal of very heavy full fruit boxes 160. After a fruit box 160 has been filled and dropped off from harvester section 10 or 12, a tractor with lifting forks is normally used to move the full box out of the orchard or onto a hauling truck. FIG. 17 shows the rear end 17 of a harvester section which has been adapted to support the fruit or nut boxes 160. Shown in solid lines is a fruit box 160 supported on the box holding platform 162 in an elevated position to receive produce from conveyor 60. Shown in dotted lines is the hitch 74 with attached platform 162 lowered to allow the sliding on or off of a box 160. A second box 160 is shown in dotted lines to illustrate a loaded box which has already been filled and dropped off.

My harvester as described in this disclosure has been found to be significantly faster and more thorough than any other similar harvester of the part art or currently on the market and without damaging the trees.

Having described my invention in sufficient detail for those skilled in the art to both build and use my harvester, it should be known that the detailing in the writing and drawings is for example only, and that minor modifications can be made to my harvester without departing from the intended scope of the appended claims.

What I claim as my invention is:

1. An agricultural harvester structured of a first harvester section and a separate second harvester section adapted to harvest produce such as nuts and fruits directly from a tree, both said harvester sections adapted to simultaneously and cooperatively function together with one said harvester section adjacent one side of a tree and the other said harvester section adjacent an oppositely disposed side of said tree in a harvesting position during harvesting of said produce;

each said harvester section having a frame with a plurality of wheels attached thereto adapted to provide mobility of said harvester section; each said harvester section having a seat affixed thereto adapted for sitting on by an operator of said harvester section during said harvesting; each said harvester section having an engine attached thereto; each said harvester section having a wheel rotating means powered by said engine adapted to rotate at least one said wheel to propelled said harvester section; each said harvester section having a control means affixed adjacent said seat adapted to provide control of said rotation of said at least one said wheel by said operator while sitting on said seat; each said harvester section having steering mechanics attached to wheel support structure of at least one said wheel adapted to pivot said wheel to provide steering of said harvester section; each said harvester section having a control means affixed adjacent said seat adapted to provide said operator control of said steering mechanics; each said harvester section having a produce catch platform attached to said frame by a plurality of support members; each said catch platform positioned at an angle sloping from a high lengthwise side edge thereof to a lower lengthwise side edge thereof, said catch platforms adapted to provide a generally V-shaped produce landing surface below limbs of said tree with said harvester sections in said harvesting position; each said harvester section having an attached produce conveying means extending at least the length of and along said lower side of said catch platform adapted to receive harvested said produce from said catch platform and convey said produce into at least one produce carrying structure temporarily attached to at least one said harvester section; each said harvester section having a control means affixed adjacent said seat adapted to provide said operator control of said produce conveying means; each said harvester section having a hingedly attached seal panel of generally equal length of said catch platform, each said seal panel positioned along an outside edge of said produce conveying means of each said harvester section; each said seal panel further attached to a movement actuating means powered by said engine of said harvester section adapted to move said seal panel between a generally horizontal position to a generally vertical position and back to a generally horizontal position; each said harvester section having a control means affixed adjacent said seat adapted to provide controlled selection of said position of said seal panel by said operator while sitting on said seat; each said harvester section having a self-sealing tree trunk notch generally centrally in said seal panel adapted to slip around and seal against a tree trunk of said tree when said seal panel is lowered to said generally horizontal position with said harvester sections in said harvesting position; said seal panels of said harvester sections adapted to overlap each other when in said horizontal position with said harvester sections in said harvesting position;

said first harvester section further including a panel subsection positioned generally centrally on said catch platform over at least said lower side of said catch platform, said panel subsection attached by at least one hinge to said harvester section adapted to allow pivotal raising and lowering of said panel subsection; said first harvester section further including a shaker apparatus pivotally attached to said frame generally underneath said hingedly attached panel subsection and at an elevation generally above said conveying means along said catch platform; said shaker apparatus further including vibratory mechanics attached thereto, said vibratory mechanics powered by said engine; a control means affixed adjacent said seat adapted to provide said operator control of said vibratory mechanics while sitting on said seat; said shaker apparatus further being attached to a movement actuating means powered by said engine adapted to provide pivotal lifting and lowering of said shaker apparatus, said pivotal lifting and lowering of said shaker apparatus further allowed by and adapted to cause lifting and lowering of said panel subsection; a control means affixed to said harvester section adjacent said seat adapted to provide said operator with control of said movement actuating means of said raising and lowering of said shaker apparatus;

said shaker apparatus further including a shaker subsection having at least one shaker arm attached thereto and at least one pad affixed to a distal end of said shaker arm; said shaker subsection attached to said shaker apparatus with structuring adapted to provide movement of said shaker subsection toward and away from said seal panel whereby said shaker arm with said pad is moved toward and away from said tree; a movement actuating means attached to said shaker subsection and said first harvester section powered by said engine adapted to actuate said movement of said shaker arm toward and away from said tree; a control means affixed to said harvester section adjacent said seat adapted to provide said operator with control of said movement actuating means of said shaker subsection; said shaker arm and attached pad of said shaker apparatus with said harvester sections in said harvesting position adapted by way of both said position on said first harvester section and said movement capabilities of said shaker apparatus and shaker subsection to extend outward and upward to abut said trunk of said tree adjacent a main branch cluster above said seal panels and said produce conveying means in unobstructed view of said operator seating on said seat and vibrate said tree, said vibration of said tree adapted to cause said produce to fall onto said generally V-shaped catch platform, said sloping of said catch platforms adapted to cause said produce to fall onto said produce conveying means to be off-loaded into said at least one produce carrying structure.

2. An agricultural harvester according to claim 1 wherein said at least one produce carrying structure temporarily attached to at least one said harvester section is a hauling trailer attached to a hitch affixed to said harvester.

3. An agricultural harvester according to claim 2 wherein said trailer is a power assisted hauling trailer.

4. An agricultural harvester according to claim 2 wherein said hitch is a power operated telescoping said hitch.

5. An agricultural harvester according to claim 1 wherein said at least one produce carrying structure temporarily attached to at least one said harvester section is a produce box.

* * * * *